P. SHEEDY.
MANUFACTURE OF PISTON VALVE LOCOMOTIVE CYLINDERS.
APPLICATION FILED NOV. 22, 1918.
1,334,715.
Patented Mar. 23, 1920.
3 SHEETS—SHEET 1.
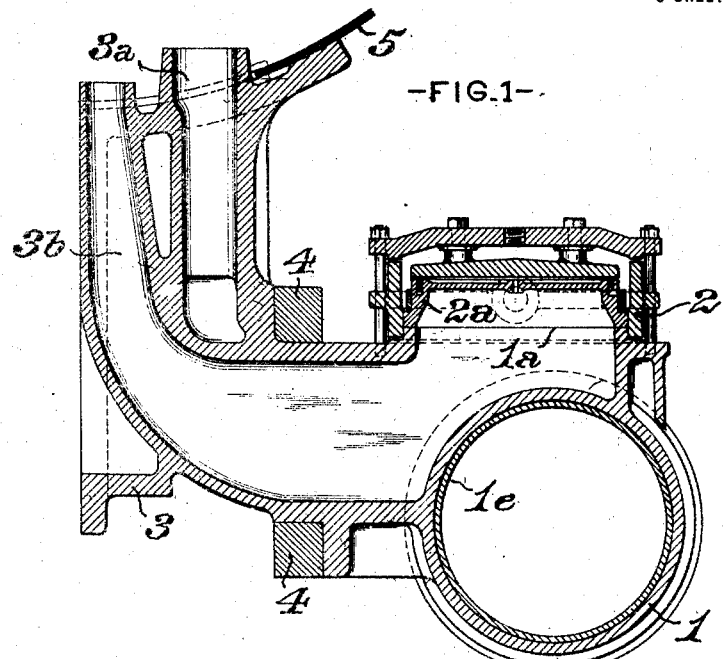
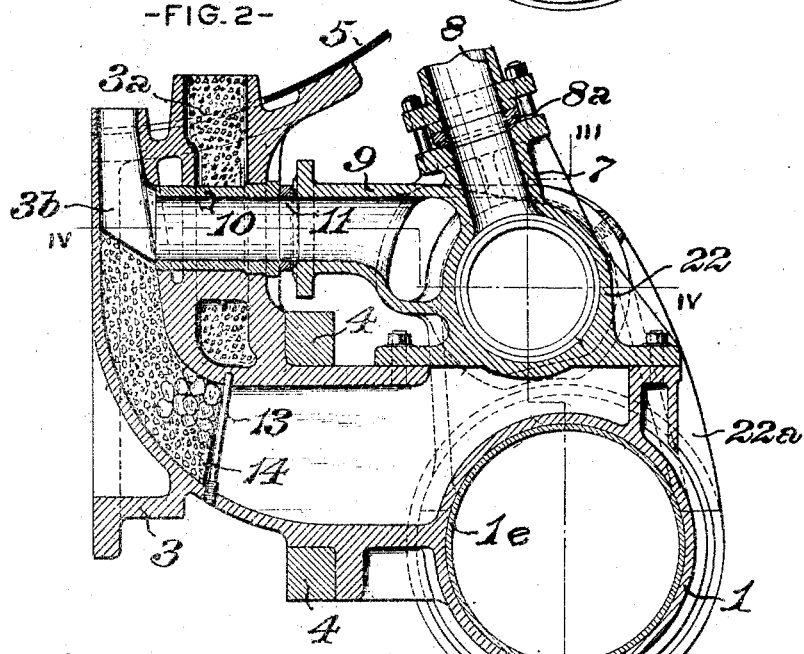

P. SHEEDY.
MANUFACTURE OF PISTON VALVE LOCOMOTIVE CYLINDERS.
APPLICATION FILED NOV. 22, 1918.
1,334,715.
Patented Mar. 23, 1920.
3 SHEETS—SHEET 2.
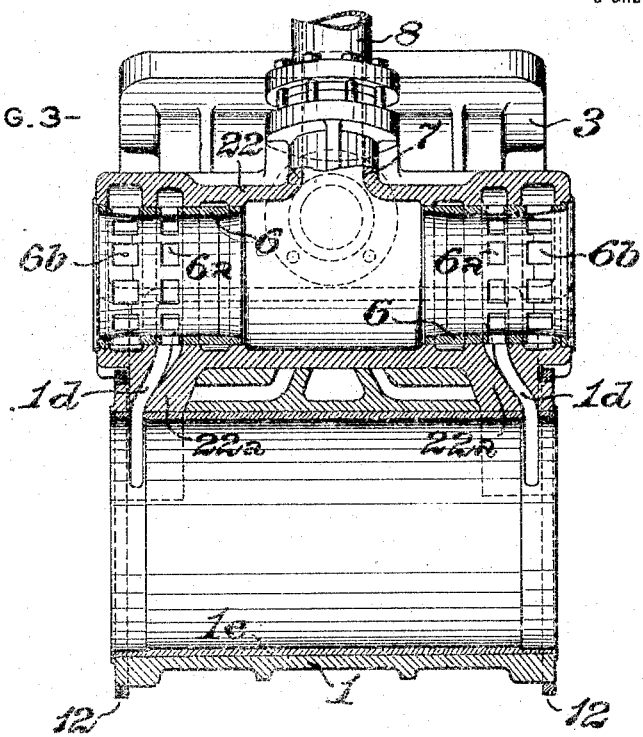
-FIG.3-
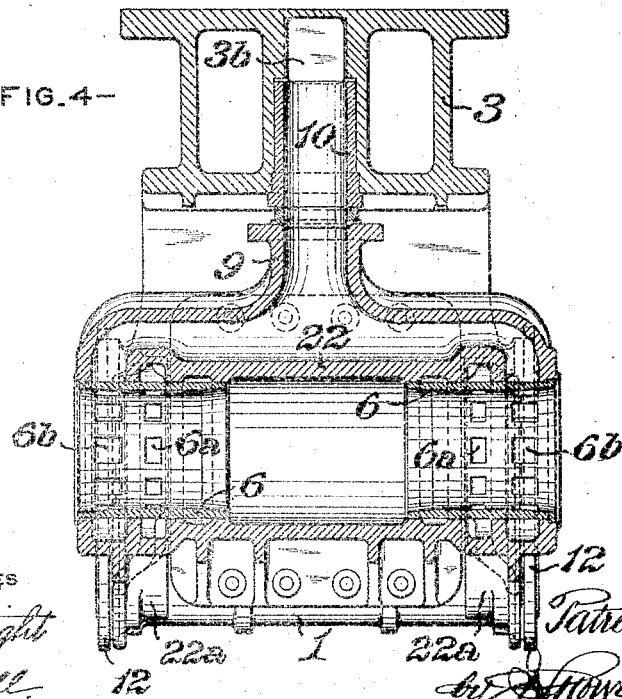
-FIG.4-
WITNESSES
Edward Wright
S. R. Bell
INVENTOR
Patrick Sheedy
by Snowden Bell
atty.

P. SHEEDY.
MANUFACTURE OF PISTON VALVE LOCOMOTIVE CYLINDERS.
APPLICATION FILED NOV. 22, 1918.
1,334,715.
Patented Mar. 23, 1920.
3 SHEETS—SHEET 3.
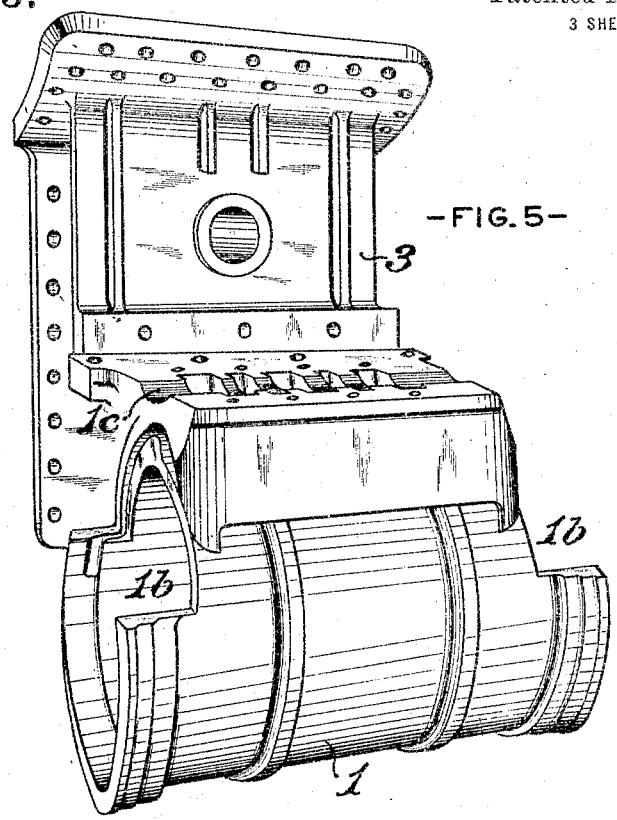
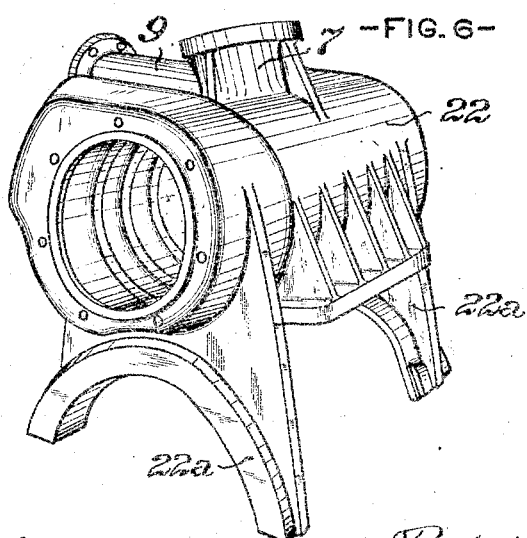

UNITED STATES PATENT OFFICE.

PATRICK SHEEDY, OF LOS ANGELES, CALIFORNIA, ASSIGNOR OF ONE-THIRD TO DANIEL P. KELLOGG AND ONE-THIRD TO DAVID ADAMSON, BOTH OF LOS ANGELES, CALIFORNIA.

MANUFACTURE OF PISTON-VALVE LOCOMOTIVE-CYLINDERS.

1,334,715.

Specification of Letters Patent. Patented Mar. 23, 1920.

Application filed November 22, 1918. Serial No. 263,706.

*To all whom it may concern:*

Be it known that I, PATRICK SHEEDY, of Los Angeles, in the county of Los Angeles and State of California, have invented a certain new and useful Improvement in the Manufacture of Piston-Valve Locomotive-Cylinders, of which improvement the following is a specification.

The object of my invention is to effect a material and substantial economy in that element of the modernization of existing locomotives which relates to improvement in cylinder construction, by a simple and inexpensive method of converting existing cylinders, of the type which has, until a comparatively recent date, been practically standard, in which steam is supplied, through an inside steam pipe, to a steam passage in the cylinder saddle, and, from said passage, to a slide distribution valve chest, into cylinders which, as now most approved in practice, are adapted to be supplied with steam through outside steam pipes and a piston distribution valve chest. The improvement claimed is hereinafter fully set forth.

The advantages of applying distribution valves of the piston type, for effecting the steam distribution functions of locomotive cylinders, as compared with those of the slide type, may be stated as comprehending reduction of the power required for operating them, by reason of their being balanced as to pressure; the greater facility which they present of being fully and economically lubricated when in operation, this latter feature being one of special importance where, as is now generally the case, the locomotive is operated with superheated steam; and the avoidance of the difficulty of making and maintaining an accurate fit between the valve chest and its seat on the cylinder, which is encountered with slide valve chests of the dimensions required in locomotives of the designs in which they are applied.

The so-called "outside" steam pipes, for supplying steam to the distribution valve chests of locomotive cylinders, are also of demonstrated advantage, in the particulars of facilitating draft, by relieving the lower portion of the smoke box of the boiler from obstruction; eliminating steam leaks through bottom steam pipe joints in the smoke box; and promoting the application of superheaters, which are now generally regarded, from an economical stand point, as being practically indispensable.

The advantages above stated are now so well and thoroughly recognized, that in practically all new locomotives, cylinders provided with piston distribution valves and outside steam pipes, are applied, and the approval of these features goes so far that, in many instances, when it has been considered advisable to modernize existing locomotives by the application of recent improvements in structural detail, the inside steam pipe slide valve cylinders and saddles have been scrapped, and entirely new ones, fitted with piston valves and outside steam pipes, substituted, such change involving, at present prices, a very considerable cost, as, say, in the neighborhood of two thousand dollars per pair of cylinders, in locomotives of the average size.

My invention enables piston valve outside steam pipe cylinders, of the present approved design, to be produced, by the conversion thereinto, of existing cylinders of the slide valve inside steam pipe type, which conversion may be effected at a cost which is only a small fraction of that above indicated, and without involving any substantial period of withdrawal of the locomotive from service.

In the accompanying drawings: Figure 1 is a vertical transverse middle section through a locomotive cylinder, valve chest, and saddle, of the slide valve inside steam pipe type, to which my invention is to be applied; Fig. 2, a similar section of the same, after its conversion into a piston valve outside steam pipe cylinder, by my invention; Fig. 3, a substantially vertical longitudinal section, on the line III, III of Fig. 2; Fig. 4, a substantially horizontal section, on the line IV, IV, of Fig. 2; Fig. 5, a view, in perspective, of the cylinder and saddle, after being prepared for the reception of the valve chest, and; Fig. 6, a similar view of the valve chest.

My invention is herein exemplified as applied to a locomotive cylinder, which, as shown in Fig. 1, is of one of the standard types heretofore and at present operating in railroad service with a slide distribution valve and an inside steam pipe. The cylinder, 1, is, in the instance shown, cast integral with a half saddle member, 3, and has, on its top, a ported valve face, 1ᵃ, which is inclosed by a valve chest 2, of rectangular form, within which, and over the valve face, a slide distribution valve, 2ᵃ, is adapted to be reciprocated in the ordinary manner. The cylinder is supported on the rails of the locomotive frame, 4, by the saddle member, which, in turn, supports the smoke box, 5, of the boiler. It will be obvious to those familiar with locomotive construction, that all the essentials of the construction shown would be presented if the cylinder was connected to an independent bed plate, of one half of which the saddle member is the equivalent, as was formerly general practice, and is yet preferred by the mechanical departments of some of the railroads of the United States.

In the practice of my invention, a circumferential recess, 1ᵇ, is formed at each end of the cylinder, 1, by cutting away the metal thereof for the major portion of its circumference above its axis, as clearly shown in Fig. 5, said recesses being provided for the reception of legs on a distribution valve chest, to be presently described. The top of the cylinder is planed off, to form a seat for said chest, and a longitudinal recess, 1ᶜ, is also preferably machined in it, said recess being curved in conformity with the lower portion of the cylindrical wall of the valve chest, for the attachment of which the cylinder will, as so acted on, be in readiness.

In substitution for the original slide distribution valve chest, 2, there is provided a piston distribution valve chest, 22, in the end portions of which are fitted open ended valve bushings, 6, 6, each provided with a plurality of admission ports, 6ᵃ, and a plurality of exhaust ports, 6ᵇ. Curved legs, 22ᵃ, each adapted to fit in one of the end recesses, 1ᵇ, of the cylinder, are formed at the ends of the valve chest, and an induction and eduction port, 1ᵈ, is cored in each of the legs, 22ᵃ. The ports, 1ᵈ, extend directly between the cylinder and the valve bushings, and, as will be seen by reference to Fig. 3, they are of the shortest possible length, and are wholly independent of the longer or original ports of the cylinder, which ports are, as also indicated in Fig. 3, disused under my invention. An upwardly extending steam supply nozzle, 7, is cast on the top of the valve chest, and an exhaust discharge conduit, 9, extends horizontally from its inner side, said conduit communicating, at each end of the valve chest, with an annular space therein surrounding, and continuously open to, the exhaust ports, 6ᵇ, of the valve bushing at that end of the chest.

In order to enable the exhaust discharge conduit, 9, to be connected with the existing exhaust passage, 3ᵇ, of the saddle member, the latter is bored out, in line axially with the desired position of the conduit, 9, and a pipe section, 10, is, as shown in Fig. 2, fitted into the opening thereby made, said pipe section passing through the original steam supply passage, 3ᵃ, of the saddle member, and having ground joints made with the walls of said member. The outer end of the pipe section, 10, is bolted to the adjoining end of the exhaust discharge conduit, a ball joint ring, 11, being interposed to make and maintain a tight joint.

The several members of the cylinder and valve chest structure having been provided, and subjected to the mechanical acts or operations above described, by which, together with the further acts now to be described, the original slide valve inside steam pipe cylinder is transformed and reduced to a different state or thing, i. e., a piston valve outside steam pipe cylinder, the assemblage of the members, for operation in the transformed or converted cylinder, is effected as follows.

The valve chest, 22, is placed on the cylinder, 1, its legs, 22ᵃ, being fitted accurately in the end recesses, 1ᵇ, which were cut in the latter, and the cylinder and valve chest are firmly and permanently secured together, so as to constitute, to all intents and purposes, the equivalent of an integral structure, by wrought iron bands, 12, which are shrunk on and around the cylinder and the legs, 22ᵃ, of the valve chest, as shown in Fig. 3. The cylinder and valve chest are then bored out, and a bushing, 1ᵉ, of the ordinary type, fitted in the cylinder, said bushing covering the joints between the legs of the valve chest and the cylinder, and effectually preventing leakage at these joints, which, it will be seen, are the only ones, between the valve chest and cylinder, at which leakage would be possible. The valve bushings, 6, 6, are inserted in the valve chest, and the discharge conduit, 9, is connected to the pipe section, 10.

The exhaust passage, 3ᵇ, of the saddle member, is preferably filled, below the connection of the pipe section, 10, therewith, either partially or wholly, with a suitable composition, as a mixture of cement and iron borings, concrete, etc., which may be retained in place by bolts, 13, and a plate, 14, as large as can be put in at top. The original steam supply passage, 3ᵃ, of the saddle member should be closed, as by a plug or cap, and may also have a suitable filling inserted.

The completed structure, as above described, is in condition for the connection of an ordinary outside steam pipe, 8, which can be bolted to an end flange on the steam supply nozzle, 7, of the valve chest, a ball joint ring, 8ᵃ, being interposed between the nozzle and steam pipe.

By the above method of transformation or conversion, which it will be obvious, can be carried out at comparatively slight expense, and with but little delay to the operation of the locomotive, piston distribution valve chests and outside steam pipes may be applied to locomotive cylinders, which were constructed for operation with slide distribution valves and inside steam pipes, with the same facility as if said cylinders had been, as originally cast, adapted for such application, and in the improvement or modernization of the locomotive, in this particular, the very substantial economy of avoiding the abandonment and scrapping of a valuable pair of cylinders is attained.

A special feature of novelty and advantage of the invention is presented in the complete elimination of steam leaks, by avoiding the use of the ordinary detachable valve chests, of bottom dimensions as large as those necessary with slide valves, and having joint wires interposed between them and the cylinder faces. With chests of such character, assuming the uncertain possibility of applying them without distorting or disturbing the joint wires, there remains the inevitable stretching of the fastening bolts in service, and as often as these are tightened, the valve chest and valve stem are correspondingly thrown out of alinement.

A further advantage, which will be recognized by locomotive designers and constructors, is the capacity of providing direct induction and eduction ports, of minimum length and resultant reduction of clearance space, which capacity is not attainable with the ordinary detachable valve chests, as these necessitate the retention of the original long ports, extending from the ends of the cylinder to the sides of the central exhaust port.

I claim as my invention and desire to secure by Letters Patent:

1. The improvement in the manufacture of piston valve locomotive cylinders which consists in transforming or converting a slide valve cylinder into a piston valve cylinder, by a series of acts comprising cutting circumferential end recesses in the cylinder; fitting a piston distribution valve chest thereon, and engaging it therewith by legs on the chest entering the end recesses of the cylinder; and securing the valve chest and cylinder together by shrinking bands around them.

2. The improvement in the manufacture of piston valve locomotive cylinders which consists in transforming or converting a slide valve cylinder into a piston valve cylinder, by a series of acts comprising cutting circumferential end recesses in the cylinder; fitting a piston distribution valve chest thereon, and engaging it therewith by legs on the chest entering the end recesses of the cylinder; securing the valve chest and cylinder together by shrinking bands around them; and covering the joints between the valve chest and cylinder by inserting a bushing in the cylinder.

3. The improvement in the manufacture of piston valve locomotive cylinders which consists in transforming or converting a slide valve cylinder into a piston valve cylinder, by a series of acts comprising cutting circumferential end recesses in the cylinder; fitting a piston distribution valve chest thereon and closing the original cylinder induction and eduction ports, by engaging legs on the chest, having short direct ports, with the end recesses of the cylinder; and securing the valve chest and cylinder together by shrinking bands around them.

4. The improvement in the manufacture of piston valve locomotive cylinders which consists in transforming or converting a slide valve cylinder into a piston valve cyinder, by a series of acts comprising cutting circumferential end recesses in the cylinder; fitting a piston distribution valve chest thereon, and engaging it therewith by legs on the chest entering the end recesses of the cylinder; forming an exterior connection between the exhaust passage of the cylinder saddle and the valve chest; and securing the valve chest and cylinder together by shrinking bands around them.

5. As a new article of manufacture, a locomotive cylinder having a piston distribution valve chest which is fitted upon it, and engaged with it by legs on the chest fitting circumferential recesses in the ends of the cylinder, and is secured to the cylinder by bands shrunk around it and the cylinder.

6. As a new article of manufacture, a locomotive cylinder having a piston distribution valve chest which is fitted upon it, and engaged with it by legs on the chest fitting circumferential recesses in the ends of the cylinder, and is secured to the cylinder by bands shrunk around it and the cylinder, and a bushing fitted in the cylinder and closing the joints between it and the valve chest.

7. As a new article of manufacture, a locomotive cylinder having a piston distribution valve chest which is fitted upon it, and engaged with it by legs on the chest fitting circumferential recesses in the ends of the cylinder, said legs having short direct induction and eduction ports intercepting the course of ordinary ports leading toward the middle of a cylinder, and bands shrunk around the valve chest legs and cylinder and securing them together.

8. As a new article of manufacture, a locomotive cylinder having a piston distribution valve chest which is fitted upon it, and engaged with it by legs on the chest fitting circumferential recesses in the ends of the cylinder, said valve chest having a connection for an outside steam supply pipe and a connection exterior to the saddle member of the cylinder, with the exhaust passage thereof, and bands shrunk around the valve chest legs and cylinder and securing them together.

9. As a new article of manufacture, a piston distribution valve chest for a locomotive cylinder having end legs adapted to engage recesses in the cylinder and to extend into said recesses and through the cylinder wall, and a direct induction and eduction port extending through each leg.

10. As a new article of manufacture, a piston distribution valve chest for a locomotive cylinder, having end legs adapted for engagement with recesses in the cylinder, and a direct induction and eduction port extending through each leg, an upper nozzle for connection to an outside steam supply pipe, and a lateral conduit for connection to the exhaust passage of the saddle member of the cylinder.

PATRICK SHEEDY.

Witnesses:
W. B. TUDOR,
I. D. BRODEK.